US012300417B2

(12) United States Patent
Tonogai et al.

(10) Patent No.: US 12,300,417 B2
(45) Date of Patent: May 13, 2025

(54) ELECTRONIC COMPONENT AND INFORMATION READING METHOD

(71) Applicant: TDK CORPORATION, Tokyo (JP)

(72) Inventors: Toru Tonogai, Tokyo (JP); Kyosuke Inui, Tokyo (JP); Yuichi Oyanagi, Tokyo (JP); Izuru Kimura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 880 days.

(21) Appl. No.: 17/499,269

(22) Filed: Oct. 12, 2021

(65) Prior Publication Data

US 2022/0115177 A1 Apr. 14, 2022

(30) Foreign Application Priority Data

Oct. 13, 2020 (JP) ................................ 2020-172652

(51) Int. Cl.
*H01F 27/28* (2006.01)
*H01F 27/25* (2006.01)
*H01F 27/255* (2006.01)

(52) U.S. Cl.
CPC ....... *H01F 27/2804* (2013.01); *H01F 27/255* (2013.01); *H01F 2027/2809* (2013.01)

(58) Field of Classification Search
CPC ............... H01F 27/2804; H01F 27/255; H01F 2027/2809
See application file for complete search history.

(56) References Cited

U.S. PATENT DOCUMENTS

2014/0145814 A1* 5/2014 Lee ..................... H01F 17/0013 336/200
2016/0012961 A1* 1/2016 Suzuki .................... H01F 27/29 29/602.1
2018/0061551 A1* 3/2018 Kondou ................ H01F 41/122
2018/0096775 A1* 4/2018 Shibuya .................. H01F 41/02
2019/0115127 A1* 4/2019 Iso ......................... H01F 27/255
2020/0152370 A1* 5/2020 Kang .................. H01F 17/0013
2020/0350110 A1 11/2020 Shibuya et al.
2020/0381159 A1* 12/2020 Sano ........................ H01F 27/32
2020/0395167 A1* 12/2020 Haseyama ............ H01F 41/046
2020/0409338 A1* 12/2020 Takahashi ............ H01G 13/003
2021/0057146 A1* 2/2021 Yang ..................... H01F 27/292
2021/0134518 A1 5/2021 Kondo et al.
2021/0259111 A1* 8/2021 Okumura ................. H05K 1/03

FOREIGN PATENT DOCUMENTS

JP 2005-045103 A 2/2005
JP 2018-037516 A 3/2018
JP 2018-056475 A 4/2018

* cited by examiner

*Primary Examiner* — Malcolm Barnes
(74) *Attorney, Agent, or Firm* — Oliff PLC

(57) ABSTRACT

An element body includes a metal-particle-dispersed body in which metal particles are dispersed, the metal-particle-dispersed body includes a display region on a surface, and the display region includes a display pattern in which a resin exposed portion where a resin appears on a surface and a metal exposed portion where the metal particles appear on the surface are alternately repeated.

15 Claims, 6 Drawing Sheets

ELECTRONIC COMPONENT AND INFORMATION READING METHOD

BACKGROUND OF THE INVENTION

1. Field of the Invention

The present invention relates to an electronic component including a display region where information writing and information reading are easy, and a method capable of easily reading information included in the display region of the electronic component.

2. Description of the Related Art

For example, as illustrated in JP 2018-56475 A, a display region is provided on a surface of an electronic component, and a model number of the electronic component, a manufacturing lot number, an identification symbol indicating performance of the electronic component, or symbols or characters such as identification symbols of orientation and the like of the electronic component may be written. The characters and the symbols (including barcodes, two-dimensional codes, and the like) provided on the display region are frequently formed by laser engraving.

Moreover, in order to prevent erroneous recognition of the characters and the symbols written in a display portion, it is recommended to deeply engrave the characters and the symbols in the surface of the electronic component with a laser. In the related art, red light is used for lighting when reading the characters and the symbols written in the display portion, and it is common knowledge that reading of the display portion is difficult unless the characters and the symbols are relatively deeply engraved in the surface of the electronic component.

SUMMARY OF THE INVENTION

The present invention has been made in consideration of the circumstances, and an object thereof is to provide an electronic component including a display region where information reading is possible even when a surface of an electronic component is not deeply engraved, and an information reading method.

To accomplish the object, the present inventors and the like have made a thorough investigation, and as a result, they have found that according to a display pattern in which a resin exposed portion where a resin appears on a surface and a metal exposed portion where metal particles appear on the surface are alternately repeated, information can be read with relatively high accuracy through irradiation with specific color light having a wavelength shorter than a wavelength of specific color light, and they have accomplished the present invention.

That is, according to an aspect of the present invention, there is provided an electronic component including an element body.

The element body includes a metal-particle-dispersed body in which metal particles are dispersed.

The metal-particle-dispersed body includes a display region on a surface.

The display region includes a display pattern in which a resin exposed portion where a resin appears on a surface and a metal exposed portion where the metal particles appear on the surface are alternately repeated.

According to the electronic component of the present invention, even though the surface of the element body of the electronic component is not deeply engraved with, for example, a laser or the like, information reading is possible. Accordingly, it is not necessary to irradiate the surface of the element body of the electronic component with laser light for creating a display region with a plurality of shots, and an output of the laser light can be reduced. In addition, a fine display pattern can also be formed, and formation of the display region in a very small electronic component is also possible.

The metal-particle-dispersed body may be a portion where the metal particles are dispersed in the resin, and the metal exposed portion may be a portion where a concave portion having a predetermined pattern is formed on the surface of the metal-particle-dispersed body and the metal particles are exposed. In addition, the resin exposed portion may be a portion where the resin remains on the surface in which the concave portion is not formed.

A resin layer may be formed on the surface of the metal-particle-dispersed body, and the metal exposed portion may be a portion where a concave portion having a predetermined pattern is formed on a surface of the resin layer and the resin layer is removed. In addition, the resin exposed portion may be a portion where the concave portion is not formed and the resin layer remains.

For example, the metal exposed portion is recessed up to a predetermined depth in comparison to the resin exposed portion. For example, the metal exposed portion is formed through irradiation with energy light such as laser light. An output of the laser light at that time may be smaller than an output of laser light in the related art, and the metal exposed portion can be formed with a small number of shots.

A concave portion having a predetermined pattern may be formed in the surface of the metal-particle-dispersed body, and a resin may be embedded in the concave portion. In addition, the resin exposed portion may be a portion where the resin is embedded, and the metal exposed portion may be a portion where the concave portion is not formed and the metal particles are exposed. A surface of the resin exposed portion may be approximately flush with or recessed from a surface of the metal exposed portion.

According to another aspect of the present invention, there is provided an electronic component including an element body.

The element body includes a magnetic particle-dispersed body in which magnetic particles are dispersed.

The magnetic particle-dispersed body includes a display region on a surface.

The display region has a display pattern in which a resin exposed portion where a resin appears on a surface and a magnetic substance exposed portion where the magnetic particles appear on the surface are alternately repeated.

In the electronic component according to the other aspect of the present invention, even though the surface of the element body of the electronic component is not deeply engraved with, for example, a laser or the like, information reading is possible. Accordingly, it is not necessary to irradiate the surface of the element body of the electronic component with laser light for creating a display region with a plurality of shots, and an output of the laser light can be reduced. In addition, a fine display pattern can also be formed, and formation of the display region in a very small electronic component is also possible.

According to still another aspect of the present invention, there is provided an information reading method from an electronic component. The method includes: irradiating a display region of the electronic component according to any one of aspects 1 to 6 in the appended claims with specific light having a wavelength shorter than a wavelength of red light; and reading information included in the display region from reflected light. The wavelength of the specific light is preferably equal to or shorter than a wavelength of green light, more preferably equal to or shorter than a wavelength of blue light, and still more preferably a wavelength of UV light.

DETAILED DESCRIPTION OF THE PREFERRED EMBODIMENTS

Hereinafter, the present invention will be described with reference to embodiments illustrated in the accompanying drawings.

First Embodiment

Figure 1:
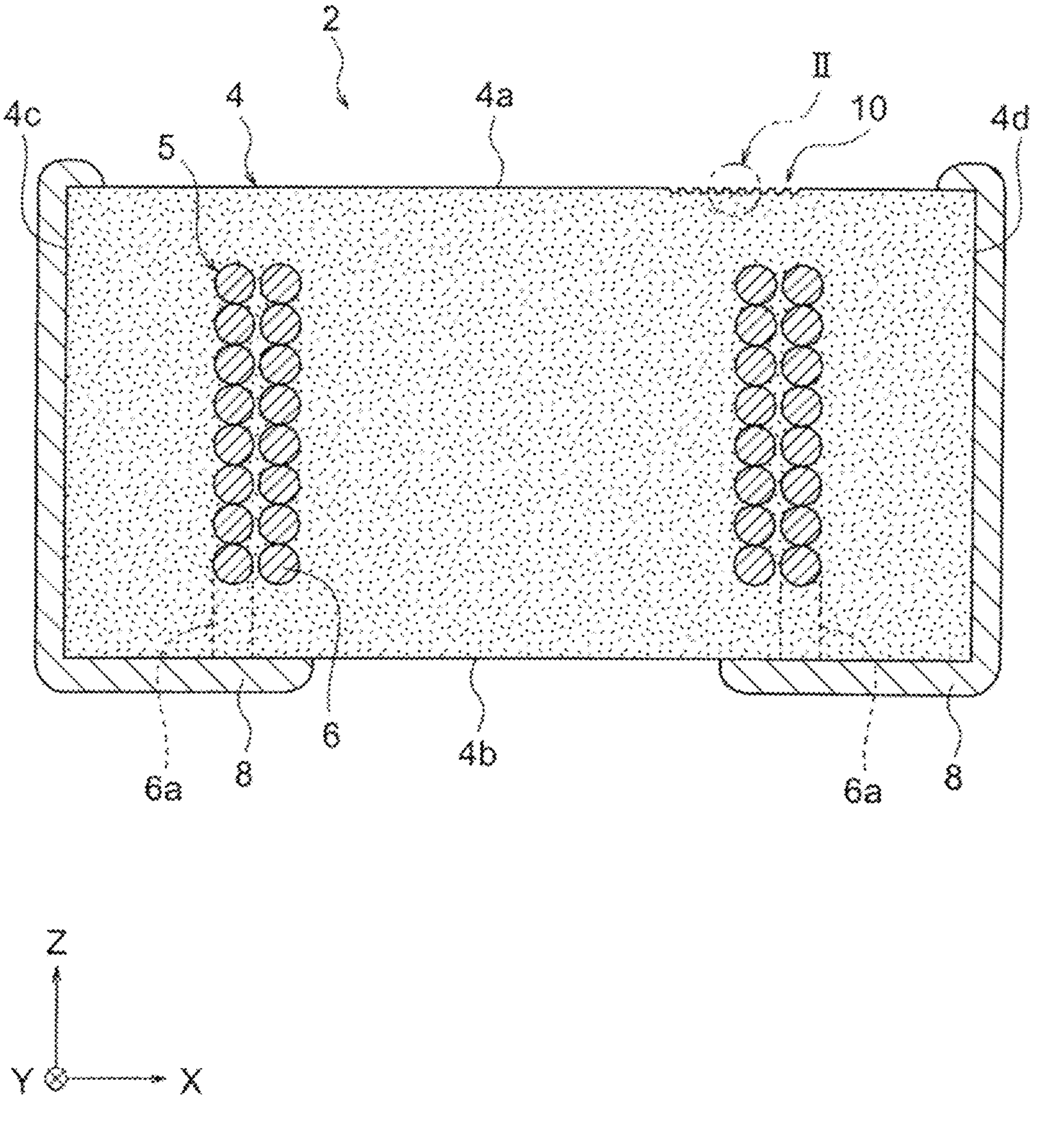
FIG. 1 is a schematic cross-sectional view of an electronic component according to an embodiment of the present invention.

As illustrated in FIG. 1, an inductor 2 as an electronic component according to an embodiment of the present invention includes an element body 4 having an approximately rectangular parallelepiped shape (approximately hexagonal shape).

The element body 4 includes an upper surface 4*a*, a bottom surface 4*b* located on a side opposite to the upper surface 4*a* in a Z-axis direction, end surfaces 4*c* and 4*d* located on sides opposite to each other along an X-axis direction, and side surfaces located on sides opposite to each other along a Y-axis (not illustrated). Dimensions of the element body 4 are not particularly limited. For example, in the element body 4, a dimension along the X-axis direction can be set to 1.2 to 6.5 mm, a dimension along the Y-axis direction can be set to 0.6 to 6.5 mm, and a dimension along a height (Z-axis) direction can be set to 0.5 to 5.0 mm.

A pair of terminal electrodes 8 are formed on the bottom surface 4*b* of the element body 4. The pair of terminal electrodes 8 are spaced apart from each other in the X-axis direction and are insulated from each other. The terminal electrodes 8 are formed to be continuous to not only the bottom surface 4*b* of the element body 4 but also the end surfaces 4*c* and 4*d* located near each of the terminal electrodes 8.

In the inductor 2 of this embodiment, an external circuit can be connected to the terminal electrodes 8 through a wiring (not illustrated) or the like. In addition, the inductor 2 can be mounted on various substrates such as a circuit substrate by using a joining member such as solder and conductive adhesive. In the case of being mounted on a substrate, the bottom surface 4*b* of the element body 4 becomes a mounting surface, and the terminal electrodes 8 and the substrate are jointed by the joining member.

The element body 4 includes a coil part 5 at the inside thereof. The coil part 5 is constructed by winding a wire 6 as a conductor in a coil shape. In FIG. 1 of this embodiment, the coil part 5 is a typical normal wise wound coreless coil, but a winding method of the wire 6 is not limited thereto. For example, the wire 6 may be an α-wound coreless coil or a flat-wound or edge-wise wound coreless coil.

The wire 6 is mainly constituted by a conductor part containing a low-resistance metal such as copper, and an insulation coating that cover an outer periphery of the conductor part. More specifically, the conductor part is composed of pure copper such as oxygen-free copper and tough pitch copper, a copper-containing alloy such as phosphor bronze, brass, red brass, beryllium copper, and silver-copper alloy, a copper covered steel wire, or the like. On the other hand, the insulation coating may have electrical insulation properties and is not particularly limited. Examples thereof include an epoxy resin, an acrylic resin, polyurethane, polyimide, polyamide imide, polyester, nylon, polyester, and a synthetic resin obtained by mixing at least two kinds of resins among the resins. In addition, in this embodiment, as illustrated in FIG. 1, the wire 6 is a round wire, and a cross-sectional shape of the conductor part is a circular shape. However, a rectangular wire or the like may be employed without limitation to the round wire.

Figure 2A:
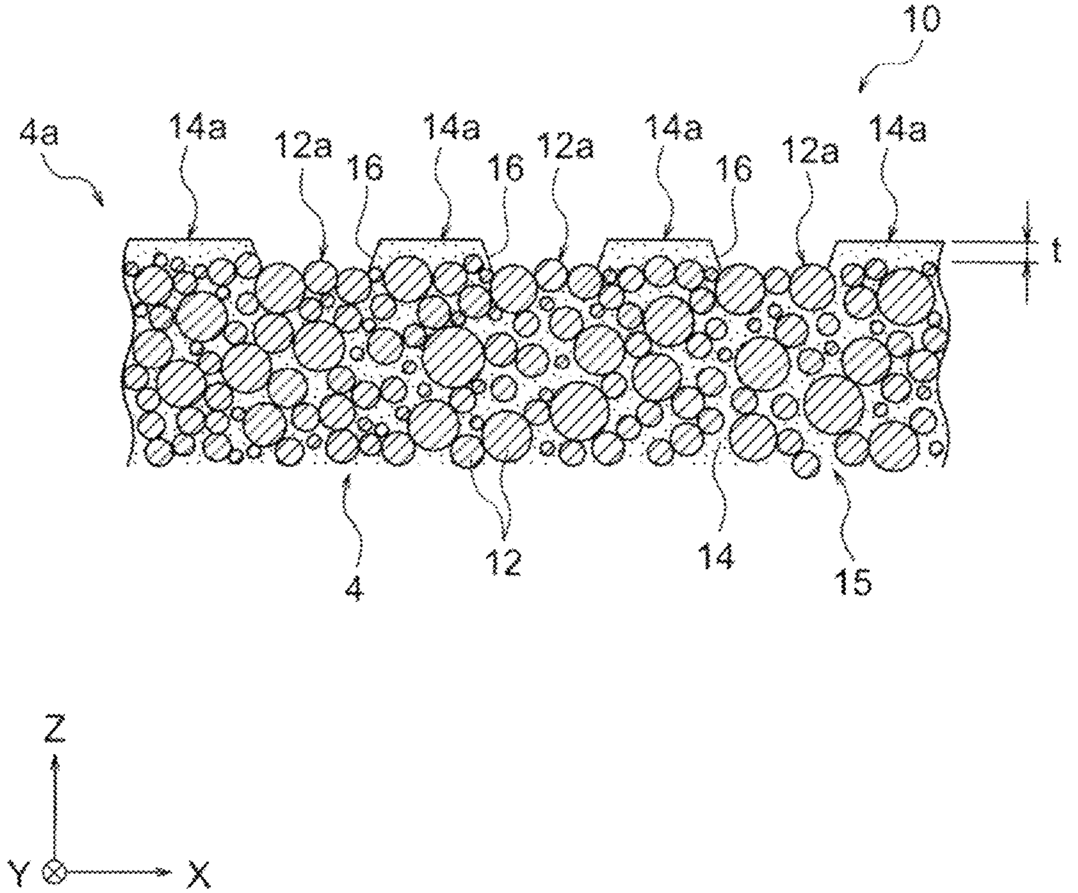
FIG. 2A is an enlarged cross-sectional view of a display region illustrated in FIG. 1.

As illustrated in FIG. 2A, for example, the element body 4 in this embodiment can be constituted by a dust core containing metal particles 12 and a resin 14. The metal particles 12 may be a magnetic material and is not particularly limited. Examples thereof include an Fe—Ni alloy, an Fe—Si alloy, an Fe—Co alloy, an Fe—Si—Cr alloy, an Fe—Si—Al alloy, an amorphous alloy containing Fe, a nanocrystal alloy containing Fe, and other soft magnetic alloys. Note that, subcomponents may be appropriately added to the metal particles 12.

With regard to the metal particles 12 contained in the element body 4, a median diameter (D50) can be set to approximately 0.1 to 100 μm. In addition, the metal particles 12 may be constituted by mixing large particles of which D50 is 10 to 50 μm, intermediate particles of which D50 is 1 to 9 μm, and small particles of which D50 is 0.3 to 0.9 μm. In addition to the combination of the three kinds of particle groups as described above, a combination of large particles and intermediate particles, a combination of large particles and small particles, a combination of intermediate particles and small particles, and the like may be employed. Note that, the large particles, the intermediate particles, and the small particles may be composed of the same material, or may be composed of different materials.

As described above, in the case of mixing the plurality of particle groups, a content ratio of each particle group is not particularly limited. For example, in the case of mixing three kinds of particle groups (large particles, intermediate particles, and small particles), when a total sum of areas occupied by the large particles, the intermediate particles, and the small particles on a cross-section of the element body 4 is set to 100%, an area occupied by the large particles is preferably set to 5% to 30%, an area occupied by the intermediate particles is preferably set to 0% to 30%, and an area occupied by the small particles is preferably set to 50% to 90%. When the metal particles 12 are constituted by the plurality of particle groups, a packing density of the metal particles 12 contained in the element body 4 can be increased. As a result, various properties of the inductor 2 such as magnetic permeability, an eddy current loss, and DC superimposition properties are improved.

Note that, a particle size of the metal particles 12, and an area occupied by each of the particle groups can be measured by observing a cross-section of the element body 4 by a scanning electron microscope (SEM), a scanning transmission electron microscope (STEM), or the like, and by image-analyzing an obtained cross-section photograph by software. At this time, it is preferable that the particle size of the metal particles 12 is measured in terms of an equivalent circle diameter.

In addition, in the metal particles 12 contained in the element body 4, the particles may be insulated from each other. Examples of an insulation method include a method of forming an insulation coating on a particle surface. Examples of the insulation coating include a film formed from a resin or an inorganic material, and an oxidized film formed by oxidizing a particle surface through a heat treatment. In the case of forming the insulation coating from the resin or the inorganic material, examples of the resin include a silicone resin and an epoxy resin.

Examples of the inorganic material include phosphates such as magnesium phosphate, calcium phosphate, zinc phosphate, and manganese phosphate, a silicate (water glass) such as sodium silicate, soda lime glass, borosilicate glass, lead glass, aluminosilicate glass, borate glass, and sulfate glass. Note that, the thickness of the insulation coating of the metal particles 12 is preferably 5 to 200 nm. When forming the insulation coating, insulation properties between particles can be increased, and a withstand voltage of the inductor 2 can be improved.

In addition, the resin 14 contained in the element body 4 is not particularly limited, and for example, it is possible to use thermosetting resins such as an epoxy resin, a phenol resin, a melamine resin, a urea resin, a furan resin, an alkyd resin, a polyester resin, and a diallyl phthalate resin, thermoplastic resins such as an acrylic resin, polyphenylene sulfide (PPS), polypropylene (PP), and a liquid crystal polymer (LCP), or the like. The content of the resin 14 can be set to 2.0 to 10 parts by weight with respect to 100 parts by weight of metal particles.

As illustrated in FIG. 1, a pair of lead parts 6*a* which are both ends of the wire 6 that constitutes the coil part 5 are exposed from the coil part 5 to an outer surface (for example, the bottom surface 4*b*) of the element body 4, and are respectively connected to the terminal electrodes 8. The lead parts 6*a* are constituted by the wire 6, but at a location exposed from the bottom surface 4*b*, the insulation coating that exists on an outer periphery side of the wire 6 is removed, and the conductor part of the wire 6 is exposed.

In this embodiment, the terminal electrodes 8 may include a resin electrode layer. In addition, the terminal electrode 8 may have a stacked structure including the resin electrode layer and another electrode layer. In a case where each of the terminal electrodes 8 is set as the stacked structure, the resin electrode layer is located at a portion that is in contact with the bottom surface 4*b* of the element body 4, the other electrode layer may be a single layer or a plurality of layers, and a material thereof is not particularly limited. For example, the other electrode layer can be composed of a metal such as Sn, Au, Cu, Ni, Pt, Ag, and Pd, or an alloy that contains at least one kind of the metal elements, and can be formed by plating or sputtering. In addition, a total thickness of the terminal electrode 8 is preferably set to 3 to 60 μm, and the thickness of the resin electrode layer is preferably set to 1 to 50 μm on average.

The resin electrode layer of the terminal electrode 8 contains a resin component and a conductor powder. The resin component in the resin electrode layer is composed of a thermosetting resin such as an epoxy resin and a phenol resin. On the other hand, the conductor powder can be composed of a metal powder such as Ag, Au, Pd, Pt, Ni, Cu, and Sn, or a metal powder of an alloy containing at least one kind among the elements, and is preferably composed of a metal powder containing, particularly, Ag as a main component.

In addition, a shape of the conductor powder can be set to a shape close to a sphere, an elongated sphere shape, an irregular block shape, a needle shape, or a flat shape, and particularly, the shape is preferably set to the needle shape or the flat shape. In this embodiment, flat particles represent particles of which an aspect ratio (a ratio of a length in a longitudinal direction to a length in a lateral direction) is 2 to 30 on a cross-section of the resin electrode layer. Note that, an average particle size of the conductor powder can be measured by observing the cross-section of the resin electrode layer by the SEM or the STEM, and by image-analyzing an obtained cross-sectional photograph. In the measurement, the average particle size of the conductor powder is calculated in terms of a maximum length.

On the cross-section of the resin electrode layer, when a total area occupied by the resin component and the conductor powder is set as 100%, an area occupied by the conductor powder is preferably 60% or less.

In this embodiment, single or a plurality of display regions 10 are formed on the upper surface 4*a* of the element body 4. An area of each of the display regions 10 is not particularly limited, and is, for example, approximately 1/20 to 19/20 of an area of the upper surface 4*a* of the element body 4.

As illustrated in FIG. 2A, in the display region 10, a display pattern, in which a resin exposed portion 14*a* where the resin 14 appears on a surface and a metal exposed portion 12*a* where the metal particles 12 appear on the surface are alternately repeated, is formed on the surface of the element body 4. In this embodiment, in a portion other than the coil part 5 illustrated in FIG. 1, the element body 4 is constituted by a metal-particle-dispersed body 15 in which the magnetic metal particles 12 are dispersed in the resin 14 as illustrated in FIG. 2A.

In the case of manufacturing the element body 4 by molding the element body 4 inside a mold, the outer surface of the element body 4 becomes a surface that comes into contact with the mold, and a surface layer of the resin 14 having a predetermined thickness is formed on the upper surface 4*a* that is a part of the outer surface. In this embodiment, the surface layer of the resin 14 formed on the upper surface 4*a* of the element body 4 is removed in a predetermined display pattern to form the display pattern, in which the resin exposed portion 14*a* and the metal exposed portion 12*a* are alternately repeated, in the display region 10 of the upper surface 4*a*.

In this embodiment, for example, laser light or the like is used to remove the surface layer of the resin 14 formed on the upper surface 4*a* of the element body 4 in a predetermined display pattern, and the upper surface 4*a* of the element body 4 is irradiated with laser light in the predetermined display pattern. According to this, a concave portion 16 of the predetermined pattern is formed on the surface layer of the resin 14, the surface layer of the resin 14 is removed, and the metal exposed portion 12*a* where a lot of the metal particles 12 appear on the surface is formed on the bottom of the concave portion 16.

In addition, a portion that is not irradiated with the laser becomes a portion where the concave portion 16 is not formed and the surface layer of the resin 14 remains, and constitutes the resin exposed portion 14*a*. The thickness t of the resin 14 of the resin exposed portion 14*a* is not particularly limited, and is preferably 1 to 30 μm.

In addition, in FIG. 2A, a depth of the concave portion 16 is approximately the same as the thickness t of the resin 14 in the resin exposed portion 14*a*, but may be larger than the thickness t. However, the depth of the concave portion 16 may be 20 μm or less or 5 μm or less from the viewpoint of a reduction of a laser output. In addition, a width (a width along the X-axis or the Y-axis) of the concave portion 16 is preferably 30 to 100 μm.

Examples of symbols expressed by the display pattern in which the resin exposed portion 14*a* and the metal exposed portion 12*a* are alternately repeated include characters, numbers, barcodes, two-dimensional codes, data matrix codes, QR codes (registered trademark), Aztec codes, and maxi codes, but there is no limitation thereto. In addition, information capable of being read by the symbols is also not particularly limited, and examples thereof include a model number of an electronic component, a manufacturing lot number, an identification symbol indicating performance of the electronic component, an identification symbol such as an orientation of the electronic component, a manufacturing date, a manufacturing location, a manufacturing method, and a material.

Next, a method of manufacturing the inductor 2 of this embodiment will be described.

First, the element body 4 is prepared. The coil part 5 is insert-molded to the element body 4. The element body 4 is molded by a press method such as heating and press molding, an injection molding method, and the like. As a raw material constituting the element body 4, a composite material having fluidity at the time of molding is used. Specifically, a composite material obtained by kneading a raw material powder of the metal particles 12, and a binder such as a thermoplastic resin and a thermosetting resin is used.

A solvent, a dispersant, and the like may be appropriately added to the composite material. In addition, in a case where the metal particles 12 illustrated in FIG. 2A are constituted by large particles, intermediate particles, and small particles, it is preferable that blending ratios of the particles in the entirety of raw material powders of the metal particles 12 are predetermined ratios. Specifically, a blending ratio of the large particles is preferably 50 wt % to 90 wt %, a blending ratio of the intermediate particles is preferably 5 wt % to 30 wt %, and a blending ratio of the small particles is preferably 0 wt % to 30 wt %.

Next, the insulation coating of the lead parts 6*a* exposed from a part of the bottom surface 4*b* of the element body 4 is removed, and the terminal electrodes 8 are formed on the bottom surface 4*b* in correspondence with the lead parts 6*a*, and the lead parts 6*a* and the terminal electrodes 8 are respectively connected to each other.

Formation of the terminal electrodes 8 is performed, for example, as follows. First, paste for resin electrodes is applied to a part of the bottom surface 4*b* of the element body 4 by a method such as a print method. At this time, the paste for resin electrodes is applied to cover the bottom surface 4*b* from which the lead parts 6*a* are exposed.

Note that, the paste for resin electrodes contains a binder that becomes a resin component and a metal raw material powder that becomes a conductor powder. In this embodiment, in the metal raw material powder, an average particle size is preferably 1 to 10 μm, and more preferably 3 to 5 μm.

After applying the paste for resin electrodes to the element body 4, the element body 4 is heated under predetermined conditions to cure the binder (resin component) in the paste. The heating conditions may be appropriately set in accordance with the kind of the binder that is used. In this manner, a resin electrode layer is formed on the bottom surface 4*b* and the end surfaces 4*c* and 4*d* of the element body 4. A plated film or a sputtered film may be appropriately formed on an outer surface of the resin electrode layer. For example, a plated film of Ni, Cu, Sn, or the like may be formed on the outer surface of the resin electrode layer to form the terminal electrodes 8. In this manner, the inductor 2 in which the pair of terminal electrodes 8 are formed on the element body 4 is obtained.

After or before the terminal electrodes 8 are formed, a portion where the terminal electrodes 8 are not formed in the upper surface 4*a* of the element body 4 is irradiated with, for example, a laser to form the display region 10.

The upper surface 4*a* of the element body 4 is irradiated with laser light in a predetermined display pattern. According to this, as illustrated in FIG. 2A, the concave portion 16 of the predetermined pattern is formed on the surface layer of the resin 14, the surface layer of the resin 14 is removed, and the metal exposed portion 12*a* where a lot of the metal particles 12 appear on the surface is formed on the bottom of the concave portion 16.

Since energy light such as laser light is emitted, although the insulation coating is formed on the surface of the metal particles 12 located on the bottom of the concave portion 16, the insulation coating is also removed, and thus a metal portion is exposed. Note that, even when the insulation coating of the metal particles 12 is not removed by the laser light, since the insulation coating of the metal particles 12 is considerably thinner than the thickness t of the surface layer of the resin 14, clear contrast exists between reflected light from the metal exposed portion 12*a* with respect to light of a specific wavelength, and reflected light from the resin exposed portion 14*a* with respect to light of the specific wavelength.

Note that, in the metal exposed portion 12*a*, for example, the resin 14 may be included in a gap or the like between the metal particles 12 adjacent to each other, or the metal particles 12 slightly covered with the resin 14 may also remain. However, an area ratio of the resin remaining in the metal exposed portion 12*a* is smaller than the resin exposed portion 14*a* by 50% or less, preferably 30% or less, and more preferably 5% or less. Accordingly, clear contrast exists between the reflected light from the metal exposed portion 12*a* with respect to light of the specific wavelength, and reflected light from the resin exposed portion 14*a* with respect to light of the specific wavelength. The area ratio of the resin remaining in the metal exposed portion 12*a* is a ratio of an area where the resin 14 instead of the metal particles 12 is observed per a unit area of the metal exposed portion 12*a* when the observation is performed in a direction (Z-axis direction) orthogonal to the display region 10.

In addition, a wavelength of the laser light that is used to form the display pattern of the display region 10 is preferably 400 nm or shorter. That is, the irradiation laser light is preferably UV laser light or the like of which a wavelength is shorter than a wavelength of green laser light (wavelength: 532 nm). As described above, since a laser having a short wavelength is used, the metal particles 12 such as the large particles and the intermediate particles are not removed, and the resin 14 of the surface layer is selectively removed.

In the inductor 2 of this embodiment, even though the outer surface (for example, the upper surface 4*a*) of the element body 4 is not deeply engraved with, for example, laser light or the like, information reading is possible. Accordingly, it is not necessary to irradiate the surface of the element body 4 of the inductor 2 with laser light for creating the display region 10 with a plurality of shots, and an output of the laser light can be reduced. In addition, a fine display pattern can also be formed, and formation of the display region 10 in the inductor 2 having a very small size is also possible.

That is, in this embodiment, as illustrated in FIG. 2A, the metal exposed portion 12*a* is recessed up to a predetermined depth in comparison to the resin exposed portion 14*a*. For example, the metal exposed portion 12*a* is formed through irradiation with energy light such as laser light. An output of the laser light at that time may be smaller than an output of laser light in the related art, and the metal exposed portion 12*a* can be formed with a small number of shots.

In the information reading method from the inductor 2 of this embodiment, the display region 10 of the inductor 2 is irradiated with specific light having a wavelength shorter than a wavelength of red light, and information included in the display region 10 can be read from the reflected light. For example, FIG. 3 illustrates images captured by a typical CCD camera by irradiating the display region 10 on the upper surface of the inductor 2 of this embodiment with illumination light sequentially from infrared light (IR) having a long wavelength, far-red light (FR), red light (R), amber light (AM), green light (G), blue light (B), and ultraviolet light (UV) of which wavelengths become shorter in this order.

Figure 3:
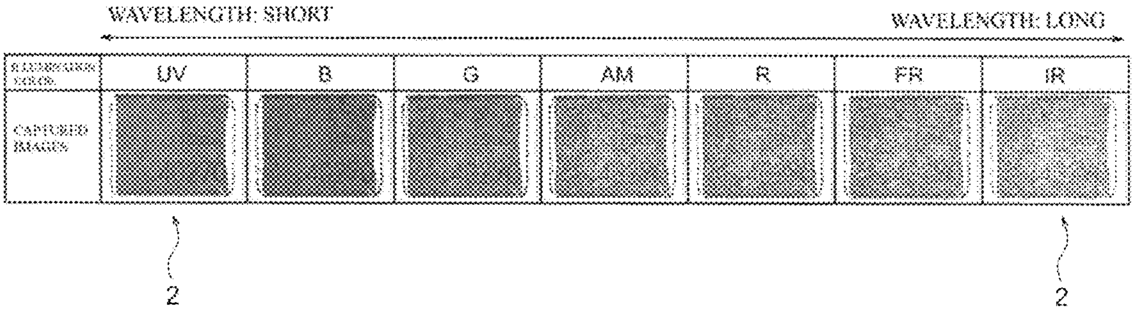
FIG. 3 is a schematic view illustrating an information reading method from the electronic component according to the embodiment of the present invention.

As illustrated in FIG. 3, it can be confirmed that when the illumination light has a wavelength of specific light which is shorter than a wavelength of red light, recognition of characters or symbols in the display region 10 becomes easy. Particularly, the wavelength of the specific light is preferably equal to or shorter than a wavelength of green light (G), more preferably equal to or shorter than a wavelength of blue light (B), and still more preferably a wavelength of UV light.

In the repetitive pattern of the metal exposed portion 12*a* and the resin exposed portion 14*a* as illustrated in FIG. 2A, even in a case where the depth of the concave portion 16 is small, it can be confirmed that information reading is possible through irradiation with illumination light preferably having a wavelength equal to or shorter than a wavelength of green light (G), more preferably a wavelength equal to or shorter than a wavelength of blue light (B), and still more preferably a wavelength of UV light.

Second Embodiment

Figure 2B:
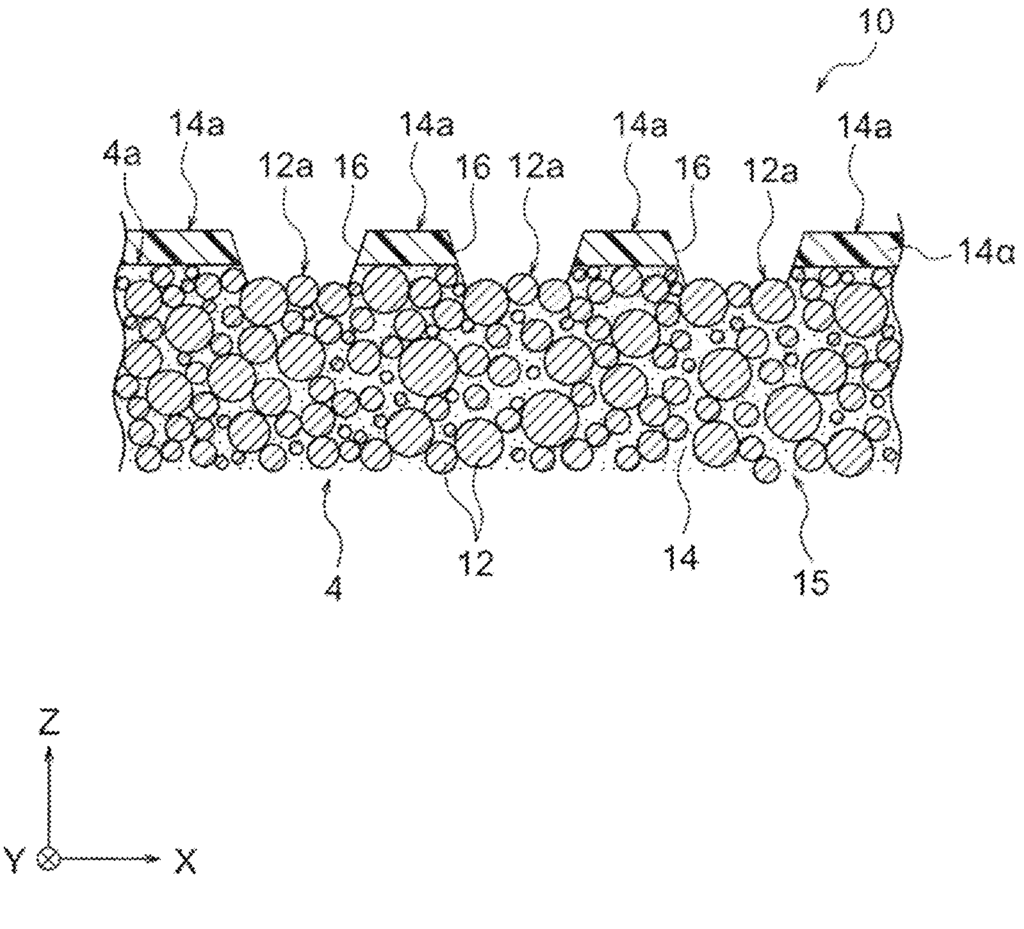
FIG. 2B is an enlarged cross-sectional view of a display region according to another embodiment of the present invention.

As illustrated in FIG. 2B, since an inductor as an electronic component according to another embodiment of the present invention is similar as in the first embodiment except for the following configuration, description of a redundant portion will be omitted, and a different portion will be mainly described in detail.

With regard to the display region 10 of the inductor of this embodiment, after a resin film (resin layer) 14α is stuck to a portion corresponding to the display region 10 in the surface of the element body 4 in advance, irradiation with energy light such as laser light is performed in a predetermined pattern to form the concave portion 16 having a predetermined pattern.

The metal particles 12 contained in the metal-particle-dispersed body 15 are exposed from the bottom of the concave portion 16 to form the metal exposed portion 12*a*. The resin film 14α in which the concave portion 16 is not formed and which remains in a predetermined pattern forms the resin exposed portion 14*a*. Accordingly, a display pattern in which the resin exposed portion 14*a* composed of the resin film 14α remaining in a predetermined pattern, and the metal exposed portion 12*a* composed of the metal particles 12 formed on the bottom of the concave portion 16 are alternately repeated is formed in the display region 10.

The depth of the concave portion 16 may be approximately the same as or larger than the depth of the concave portion 16 illustrated in FIG. 2A. Since the resin film 14α does not contain the metal particles 12, the concave portion 16 may be deeply formed at a uniform depth with the same laser output in comparison to the surface layer of the resin 14 formed on the surface of the metal-particle-dispersed body 15 illustrated in FIG. 2A.

Third Embodiment

Figure 2C:
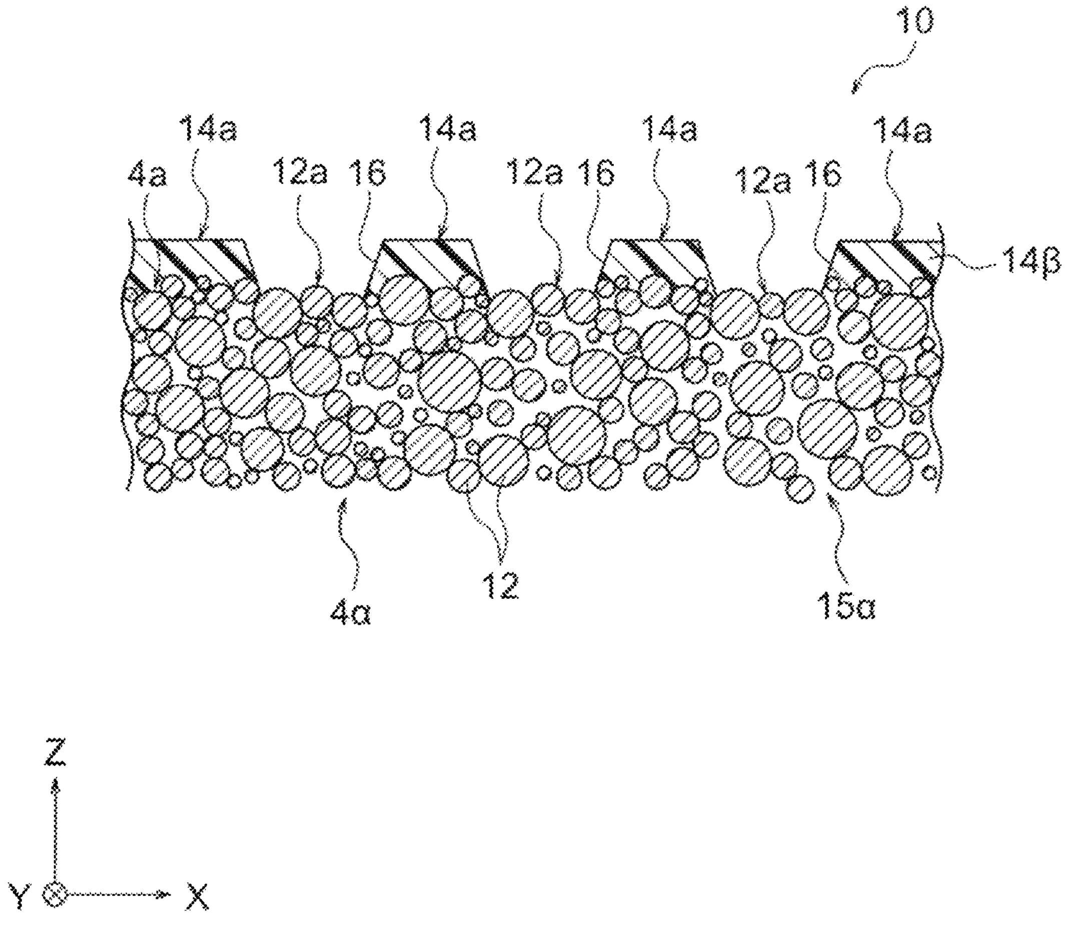
FIG. 2C is an enlarged cross-sectional view of a display region according to still another embodiment of the present invention.

As illustrated in FIG. 2C, since an inductor as an electronic component according to still another embodiment of the present invention is similar as in the first or second embodiment except for the following configuration, description of a redundant portion will be omitted, and a different portion will be mainly described in detail.

An element body 4α of the inductor of this embodiment is constituted by a metal-particle-dispersed body 15α composed of sintered metal particles 12, and hardly contains a resin. Accordingly, a resin surface layer is not formed on a surface of the metal-particle-dispersed body 15α after sintering. Here, in this embodiment, a resin application layer (resin layer) 14β is formed in a predetermined pattern on a part of the surface of the element body 4α composed of the metal-particle-dispersed body 15α after sintering. As a result, the resin exposed portion 14*a* in which the resin application layer 14β is formed, and the metal exposed portion 12*a* in which the resin application layer 14β is not formed and which is constituted by a surface portion of the metal particles 12 are formed in the display region 10 in a predetermined repetitive pattern.

Note that, for example, the resin application layer 14β having a predetermined pattern may be formed by a print method such as a screen print method. Alternatively, the resin application layer 14β having a predetermined pattern can also be formed by forming the resin application layer 14β, which is continuous in a predetermined area, on a part of the surface of the element body 4α composed of the metal-particle-dispersed body 15α after sintering by a method such as dipping and brush application, and by pattering the resin application layer 14β. Patterning may be performed through irradiation with laser light in a predetermined pattern, or may be performed by using exposure and etching, or the like.

Fourth Embodiment

Figure 2D:
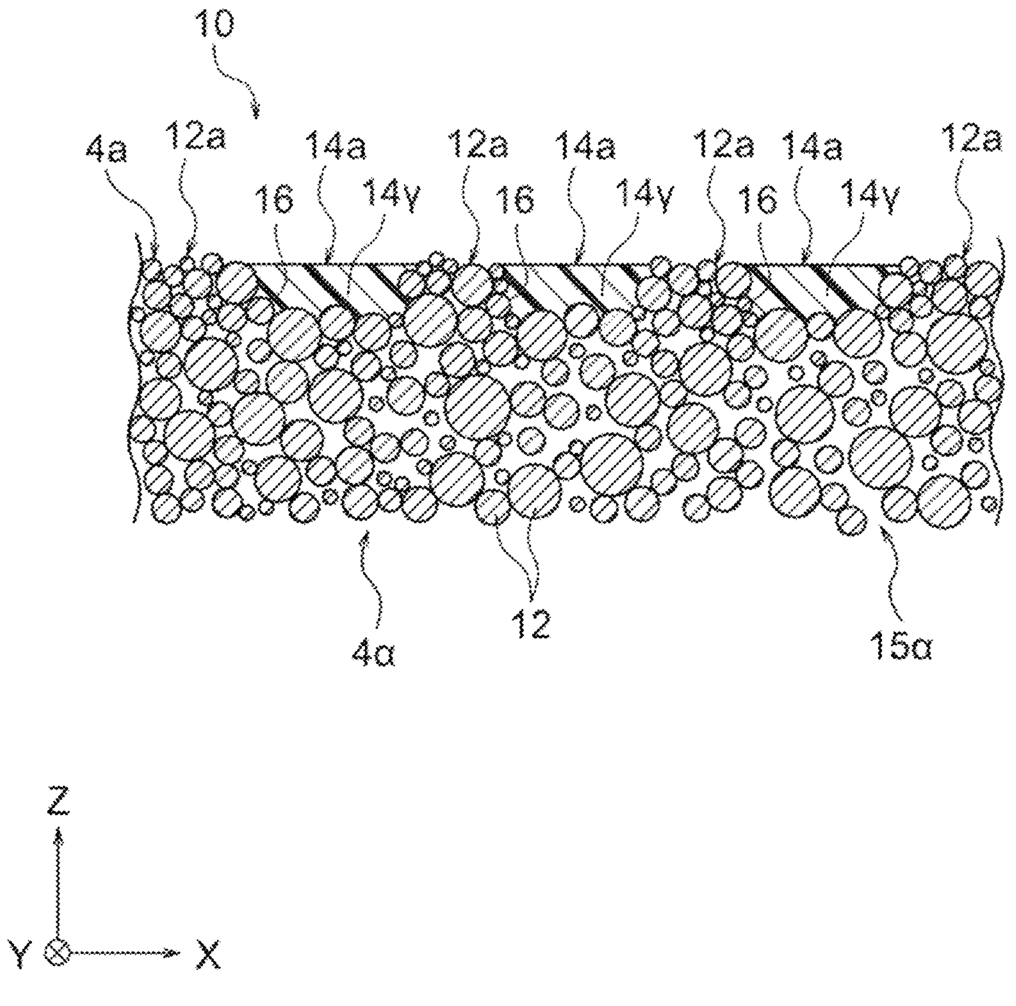
FIG. 2D is an enlarged cross-sectional view of a display region according to still another embodiment of the present invention.

As illustrated in FIG. 2D, since an inductor as an electronic component according to still another embodiment of the present invention is similar as in any of the above-described first to third embodiments, or a combination thereof except for the following configuration, description of a redundant portion will be omitted, and a different portion will be mainly described in detail.

The element body 4α of the inductor of this embodiment is constituted by the metal-particle-dispersed body 15α composed of the sintered metal particles 12, and hardly contains a resin. Accordingly, a resin surface layer is not formed on a surface of the metal-particle-dispersed body 15α after sintering. Here, in this embodiment, the concave portion 16 having a predetermined pattern is formed by irradiating a part of the surface of the element body 4α composed of the metal-particle-dispersed body 15α after sintering in a predetermined pattern with energy light such as laser light. Then, a resin embedded portion 14γ is formed in a pattern corresponding to the concave portion 16 having a predetermined pattern.

As a result, the resin exposed portion 14α in which the resin embedded portion 14γ is formed, and the metal exposed portion 12α in which the resin embedded portion 14γ is not formed and which is constituted by a surface portion of the metal particles 12 are formed in the display region 10 in a predetermined repetitive pattern. Note that, Examples of a method of embedding the resin embedded portion 14γ in the concave portion 16 having a predetermined pattern include a screen print method and an inkjet print method. In this embodiment, a surface of the resin exposed portion 14*a* may be approximately flush with or recessed from a surface of the metal exposed portion 12*a*.

Fifth Embodiment

An inductor as an electronic component according to still another embodiment of the present invention is similar as in any of the above-described first to fourth embodiments, or a combination thereof except for the following configuration, description of a redundant portion will be omitted, and a different portion will be mainly described in detail.

In this embodiment, an element body includes a magnetic particle-dispersed body in which magnetic particles other than a metal are dispersed instead of the metal-particle-dispersed body 15 or 15α in the above-described embodiments. In addition, in this embodiment, magnetic particles other than a metal are used instead of the metal particles 12 in the above-described embodiments.

The magnetic particle-dispersed body includes the display region 10 on a surface, and the display region 10 has a display pattern in which the resin exposed portion 14α where a resin appears on a surface, and a magnetic substance exposed portion where the magnetic particles appear on the surface are alternately repeated. Examples of the magnetic particles other than a metal include ferrite particles. In this case, in the case of forming the display region 10 in a similar manner as in the metal particles, it is possible to obtain an inductor including a display region from which information reading is possible even when the surface is not deeply engraved.

Note that, the present invention is not limited to the above-described embodiments, and modifications can be made in various manners within the scope of the present invention.

For example, in the above-described embodiments, the display region 10 is formed on the upper surface 4α of the element body 4, but may be formed on other outer surfaces (provided that, outer surfaces of the element body 4 on which the terminal electrodes 8 are not formed), for example, sides surfaces of the element body 4.

In addition, the element body 4 may not be embedded with the coil part 5, and may be, for example, an FT-type coil, an ET-type coil, an EI-type coil, a UU-type coil, an EE-type coil, an EER-type coil, a UI-type coil, a drum-type coil, a toroidal-type coil, a port-type coil, or a cup-type coil.

In addition, the electronic component according to the present invention is not limited to the inductor and may be an electronic component such as a transformer, a choke coil, and a common mode filter, or a composite electronic component obtained by combining different elements such as an inductor element and a capacitor element. In addition, the metal particles of the metal-particle-dispersed body constituting the element body are not limited to the magnetic particles, and may be metal particles which do not have magnetism, or ceramic particles, or the like other than a metal.

EXPLANATIONS OF LETTERS OR NUMERALS

- 2 INDUCTOR
- 4, 4α ELEMENT BODY
- **4*a*** UPPER SURFACE
- **4*b*** BOTTOM SURFACE
- **4*c*, 4*d*** END SURFACE
- 5 COIL PART
- 6 WIRE
- **6*a*** LEAD PART
- 8 TERMINAL ELECTRODE
- 10 DISPLAY REGION
- 12 METAL PARTICLES
- **12*a*** METAL EXPOSED PORTION
- 14 RESIN
- **14*a*** RESIN EXPOSED PORTION
- 14α RESIN FILM (RESIN LAYER)
- 14β RESIN APPLICATION LAYER (RESIN LAYER)
- 14γ RESIN EMBEDDED PORTION
- 15, 15α METAL-PARTICLE-DISPERSED BODY
- 16 CONCAVE PORTION

What is claimed is:

1. An electronic component comprising an element body,
   wherein the element body includes a metal-particle-dispersed body in which metal particles are dispersed,
   the metal-particle-dispersed body includes a display region on a surface, and
   the display region includes a display pattern in which a resin exposed portion where a resin appears on a surface and a metal exposed portion where the metal particles appear on the surface are alternately repeated,
   wherein the metal particles are dispersed in the resin of the metal-particle-dispersed body, and
   the metal exposed portion is a portion where a concave portion having a predetermined pattern is formed on the surface of the metal-particle-dispersed body and the metal particles are exposed, and the resin exposed portion is a portion where the resin remains on the surface where the concave portion is not formed.

2. The electronic component according to claim 1,
   wherein a concave portion having a predetermined pattern is formed on the surface of the metal-particle-dispersed body, and a resin is embedded in the concave portion,
   the resin exposed portion is a portion where the resin is embedded, and the metal exposed portion is a portion where the concave portion is not formed and the metal particles are exposed, and
   a surface of the resin exposed portion is approximately flush with or recessed from a surface of the metal exposed portion.

3. An information reading method from an electronic component, the method comprising:

irradiating the display region of the electronic component according to claim 2 with specific light having a wavelength shorter than a wavelength of red light; and reading information included in the display region from reflected light.

4. An electronic component comprising an element body, wherein the element body includes a metal-particle-dispersed body in which metal particles are dispersed, the metal-particle-dispersed body includes a display region on a surface, and the display region includes a display pattern in which a resin exposed portion where a resin appears on a surface and a metal exposed portion where the metal particles appear on the surface are alternately repeated, wherein a resin layer is formed on the surface of the metal-particle-dispersed body, and the metal exposed portion is a portion where a concave portion having a predetermined pattern is formed on a surface of the resin layer and the resin layer is removed, and the resin exposed portion is a portion where the concave portion is not formed and the resin layer remains.

5. The electronic component according to claim 4, wherein a concave portion having a predetermined pattern is formed on the surface of the metal-particle-dispersed body, and a resin is embedded in the concave portion, the resin exposed portion is a portion where the resin is embedded, and the metal exposed portion is a portion where the concave portion is not formed and the metal particles are exposed, and a surface of the resin exposed portion is approximately flush with or recessed from a surface of the metal exposed portion.

6. An information reading method from an electronic component, the method comprising:

irradiating the display region of the electronic component according to claim 4 with specific light having a wavelength shorter than a wavelength of red light; and reading information included in the display region from reflected light.

7. An electronic component comprising an element body, wherein the element body includes a metal-particle-dispersed body in which metal particles are dispersed, the metal-particle-dispersed body includes a display region on a surface, and the display region includes a display pattern in which a resin exposed portion where a resin appears on a surface and a metal exposed portion where the metal particles appear on the surface are alternately repeated, wherein the metal exposed portion is recessed up to a predetermined depth in comparison to the resin exposed portion.

8. The electronic component according to claim 7, wherein a concave portion having a predetermined pattern is formed on the surface of the metal-particle-dispersed body, and a resin is embedded in the concave portion, the resin exposed portion is a portion where the resin is embedded, and the metal exposed portion is a portion where the concave portion is not formed and the metal particles are exposed, and a surface of the resin exposed portion is approximately flush with or recessed from a surface of the metal exposed portion.

9. An information reading method from an electronic component, the method comprising:

irradiating the display region of the electronic component according to claim 7 with specific light having a wavelength shorter than a wavelength of red light; and reading information included in the display region from reflected light.

10. An electronic component comprising an element body, wherein the element body includes a magnetic particle-dispersed body in which magnetic particles are dispersed and a metal-particle-dispersed body in which metal particles are dispersed, the magnetic particle-dispersed body includes a display region on a surface, the display region has a display pattern in which a resin exposed portion where a resin appears on a surface and a magnetic substance exposed portion where the magnetic particles appear on the surface are alternately repeated, the metal particles are dispersed in the resin of the metal-particle-dispersed body, and the metal-particle-dispersed body includes a metal exposed portion, wherein the metal exposed portion is a portion where a concave portion having a predetermined pattern is formed on the surface of the metal-particle-dispersed body and the metal particles are exposed, and the resin exposed portion is a portion where the resin remains on the surface where the concave portion is not formed.

11. An information reading method from an electronic component, the method comprising:

irradiating the display region of the electronic component according to claim 6 with specific light having a wavelength shorter than a wavelength of red light; and reading information included in the display region from reflected light.

12. An electronic component comprising an element body, wherein the element body includes a magnetic particle-dispersed body in which magnetic particles are dispersed and a metal-particle-dispersed body in which metal particles are dispersed, the magnetic particle-dispersed body includes a display region on a surface, and the display region has a display pattern in which a resin exposed portion where a resin appears on a surface and a magnetic substance exposed portion where the magnetic particles appear on the surface are alternately repeated, wherein a resin layer is formed on the surface of the metal-particle-dispersed body, and the metal-particle-dispersed body includes a metal exposed portion, wherein the metal exposed portion is a portion where a concave portion having a predetermined pattern is formed on a surface of the resin layer and the resin layer is removed, and the resin exposed portion is a portion where the concave portion is not formed and the resin layer remains.

13. An information reading method from an electronic component, the method comprising:

irradiating the display region of the electronic component according to claim 12 with specific light having a wavelength shorter than a wavelength of red light; and reading information included in the display region from reflected light.

14. An electronic component comprising an element body, wherein the element body includes a magnetic particle-dispersed body in which magnetic particles are dispersed and a metal-particle-dispersed body in which metal particles are dispersed, the magnetic particle-dispersed body includes a display region on a surface, and the display region has a display pattern in which a resin exposed portion where a resin appears on a surface and a magnetic substance exposed portion where the magnetic particles appear on the surface are alternately repeated, the metal-particle-dispersed body includes a metal exposed portion, wherein the metal exposed portion is recessed up to a predetermined depth in comparison to the resin exposed portion.

15. An information reading method from an electronic component, the method comprising:

irradiating the display region of the electronic component according to claim 14 with specific light having a wavelength shorter than a wavelength of red light; and reading information included in the display region from reflected light.

* * * * *